(12) United States Patent
Matsushita

(10) Patent No.: US 12,393,247 B2
(45) Date of Patent: Aug. 19, 2025

(54) MULTI-NODE SYSTEM AND POWER SUPPLY CONTROL METHOD

(71) Applicant: Hitachi, Ltd., Tokyo (JP)

(72) Inventor: Tsubasa Matsushita, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 41 days.

(21) Appl. No.: 18/462,829

(22) Filed: Sep. 7, 2023

(65) Prior Publication Data

US 2024/0219986 A1   Jul. 4, 2024

(30) Foreign Application Priority Data

Dec. 28, 2022   (JP) ................................ 2022-212295

(51) Int. Cl.
  *G06F 11/30*   (2006.01)
  *G06F 1/30*   (2006.01)
  *G06F 1/3225*   (2019.01)
(52) U.S. Cl.
  CPC ............ *G06F 1/305* (2013.01); *G06F 1/3225* (2013.01); *G06F 1/30* (2013.01)
(58) Field of Classification Search
  CPC ........... G06F 1/305; G06F 1/3225; G06F 1/30
  USPC ....................................................... 713/340
  See application file for complete search history.

(56) References Cited

U.S. PATENT DOCUMENTS

| | | | | |
|---|---|---|---|---|
| 4,677,311 A | * | 6/1987 | Morita | H02J 9/061 307/64 |
| 7,254,742 B2 | * | 8/2007 | Hayashi | G06F 1/3221 714/24 |
| 9,104,397 B2 | * | 8/2015 | Kuroda | G06F 11/1441 |
| 2006/0190747 A1 | * | 8/2006 | Fukumori | G11B 19/08 713/300 |
| 2011/0051276 A1 | * | 3/2011 | Fukuyama | G06F 1/3203 |
| 2011/0208998 A1 | * | 8/2011 | Hosaka | G06F 11/1441 714/14 |
| 2012/0159210 A1 | * | 6/2012 | Hosaka | G06F 1/3268 713/320 |
| 2012/0221801 A1 | * | 8/2012 | Okawa | G06F 1/3212 711/154 |
| 2016/0004452 A1 | * | 1/2016 | Hayes | G06F 3/0619 710/308 |
| 2016/0259571 A1 | * | 9/2016 | Kumasawa | G06F 3/0619 |

(Continued)

FOREIGN PATENT DOCUMENTS

JP   2006-235673 A   9/2006

*Primary Examiner* — Volvick Derose
(74) *Attorney, Agent, or Firm* — Foley & Lardner LLP

(57) ABSTRACT

In the event of a partial outage, a multi-node system is enabled to start processing easily and appropriately. The multi-node system includes multiple nodes each including at least one controller, the controller including a processor, a power supply control microcomputer, a memory, and a nonvolatile memory. The processor detects whether or not any one of the nodes is inactive due to a power outage. The processor determines whether or not operation of the multi-node system can be continued, on the basis of operational status of the nodes. Upon determination that the operation of the multi-node system cannot be continued, the processor saves necessary data held in the memory into the nonvolatile memory. The power supply control microcomputer restarts the processor. When the node in the power outage has recovered therefrom following the restart, the multi-node system is caused to start processing.

6 Claims, 4 Drawing Sheets

(56) References Cited

U.S. PATENT DOCUMENTS

| | | | |
|---|---|---|---|
| 2016/0259695 A1* | 9/2016 | Hosaka | G06F 12/0868 |
| 2017/0344313 A1* | 11/2017 | Hayasaka | G06F 3/08 |
| 2019/0332312 A1* | 10/2019 | Hayashi | G06F 3/0688 |
| 2020/0178337 A1* | 6/2020 | Hanley | H04W 40/244 |
| 2021/0271428 A1* | 9/2021 | Su | G06F 3/0688 |

* cited by examiner

MULTI-NODE SYSTEM AND POWER SUPPLY CONTROL METHOD

BACKGROUND OF THE INVENTION

1. Field of the Invention

The present invention relates to a power supply control technology for use with a multi-node system having multiple nodes each including at least one controller.

2. Description of the Related Art

There is known, for example, a multi-node configuration system (multi-node system) that permits a small start to meet requirements of a customer and that readily offers performance improvement when expanded with nodes.

In the multi-node system, a node is required to start up automatically upon recovery from a power outage and to return to the state immediately before the power outage, i.e., to a state where input/output (I/O) processing can be performed.

In view of this, each of the nodes of the multi-node system is configured to have a function of automatically turning on power upon recovery from a power outage (known as the Auto-PSON function). In a case where all nodes of the multi-node system are subjected to a power interruption due to a power outage and then restore power, this configuration allows all nodes to start up to reach the state in which I/O processing can be performed.

In the related art, Japanese Patent Laid-open No. 2006-235673, for example, discloses a technology for use with a disk array apparatus in a multiplexed configuration with a power supply part and a disk storage controller (called DKC). In a case where one of clusters involved stops due to a power outage, the technology allows another cluster to recognize that the one cluster is inactive because of the power outage and to perform processing to restart the inactive cluster.

SUMMARY OF THE INVENTION

In a multi-node system having power boundaries between nodes, there is a possibility of a partial outage taking place internally. For example, where some of the nodes manage control information necessary for the I/O processing of the multi-node system and where a partial outage occurs and deactivates a node, the still-active nodes (remaining nodes) detect inactivity of the other node and perform a blocking process to block themselves.

In such a case, when power is restored from the partial outage, the inactive node is turned on and started but the remaining nodes stay blocked. As a result, the multi-node system cannot return to the state before the partial outage where the I/O processing can be performed.

In this case, for example, work by maintenance personnel is needed to restart the remaining nodes. There is a fear that it may take an extended period of time for the multi-node system to resume the I/O processing.

The present invention has been made in view of the above circumstances and proposes providing a technology which, in the event of a partial outage of a multi-node system, allows the multi-node system to resume processing easily and appropriately.

In achieving the foregoing and other objects of the present invention and according to one aspect thereof, there is provided a multi-node system having a plurality of nodes each including at least one controller, the controller including a processor, a power supply control device configured to control supply of power to the controller, a volatile memory, and a nonvolatile memory. The processor detects whether or not any one of the nodes is inactive due to a power outage, determines whether or not operation of the multi-node system can be continued, on the basis of operational status of the nodes, and, upon determination that the operation of the multi-node system cannot be continued, saves necessary data held in the volatile memory into the nonvolatile memory. The power supply control device restarts the processor, and, when the node in the power outage has recovered therefrom following the restart, the multi-node system is caused to start processing.

In the event of a partial outage of the multi-node system, the present invention thus allows the system to start its processing easily and appropriately.

DESCRIPTION OF THE PREFERRED EMBODIMENT

A preferred embodiment of the present invention is described below with reference to the accompanying drawings. It is to be noted that the embodiment to be explained below is not limitative of the present invention as claimed by the appended claims and that not all constituents or their combinations explained in conjunction with the embodiment are indispensable as means for solving the above-mentioned problems.

In the description that follows, information may be explained using an expression "AAA table." However, information may be expressed using any other data structure. That is, the expression "AAA table" may be rephrased as "AAA information" so as to indicate that the information is not dependent on any specific data structure.

Figure 1:
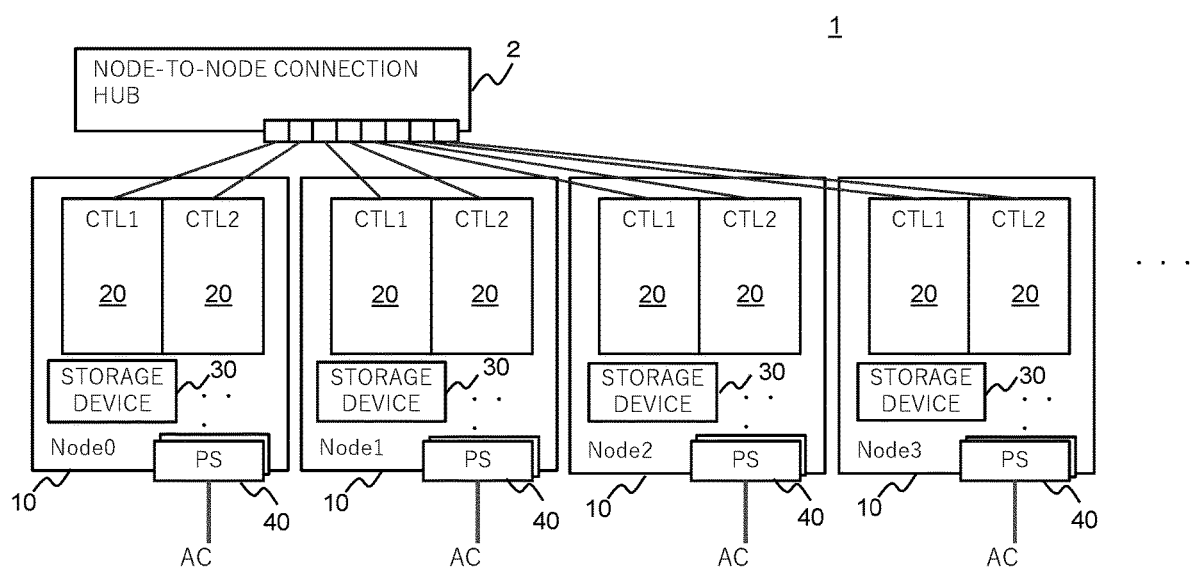
FIG. 1 is an overall configuration diagram of a multi-node system embodying the present invention.

FIG. 1 is an overall configuration diagram of a multi-node system 1 embodying the present invention.

The multi-node system 1 has multiple nodes 10 operating in cooperation with each other to perform I/O processing on the data being managed. In this embodiment, some of the multiple nodes 10 store control information necessary for the I/O processing to be carried out by the nodes 10. The multi-node system 1 includes the multiple nodes 10 and a node-to-node connection hub 2 that permits inter-node communication between the nodes 10. The node-to-node connection hub 2 and the nodes 10 are interconnected via communication lines (e.g., Peripheral Component Interconnect-Express (PCIe) lines). In this embodiment, the node-to-node connection hub 2 is connected with each controller 20 of each node 10 via at least one communication line.

The node 10 is, for example, a storage apparatus that manages data. As such, the node 10 includes at least one controller (CTL) 20, at least one storage device 30, and at least one power supply part (PS) 40.

The controller 20 controls the I/O processing on the data in the storage device 30 initiated from an external apparatus, not depicted. For example, the storage device 30 may be a hard disk or a flash memory that stores diverse kinds of data. The power supply part 40 converts commercial alternating current (AC) to direct current (DC) in order to power the components in the node 10.

A detailed configuration of the multi-node system 1 is explained below.

Figure 2:
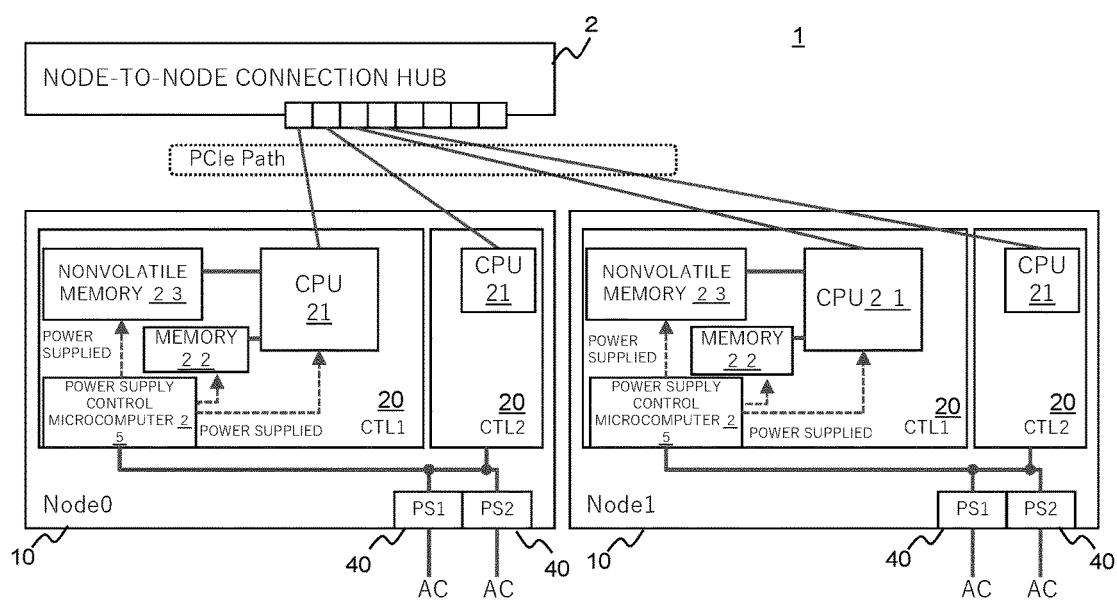
FIG. 2 is a detailed configuration diagram of the multi-node system embodying the present invention.

FIG. 2 is a detailed configuration diagram of the multi-node system 1 embodying the present invention. In FIG. 2, some of the components of the system are not depicted.

Each node 10 in the multi-node system 1 includes two controllers 20 and two power supply parts 40. In this embodiment, each of the power supply parts 40 is configured to supply power to the two controllers 20.

Each controller 20 includes a central processing unit (CPU) 21 as a typical processor, a memory 22, a nonvolatile memory 23, and a power supply control microcomputer 25 as a typical power supply control device.

The CPU 21 performs various processes in accordance with programs held in the memory 22.

The memory 22 is, for example, a volatile memory such as a dynamic random access memory (DRAM). The memory 22 stores the programs to be executed by the CPU 21, the data necessary for processing by the CPU 21, and the data to be written to and read from the storage device 30. The memory 22 also holds an operational status monitoring table 50.

The nonvolatile memory 23 is, for example, a memory such as a flash memory that retains data without being supplied with power.

The power supply control microcomputer 25 controls the supply of power to the components such as the CPU 21, the memory 22, and the nonvolatile memory 23 inside the controller 20. Upon detecting the occurrence of a power outage, the power supply control microcomputer 25 causes the CPU 21 and other components to be supplied with power from a battery, not depicted, and orders execution of power outage processing such as a process of saving data. When the power outage processing is terminated, the power supply control microcomputer 25 stops the supply of power to the CPU 21 and other components. Later, when the power is restored, the power supply control microcomputer 25 starts the supply of power to the CPU 21 and other components. In this embodiment, upon receipt of a request for power outage operations from the CPU 21, the power supply control microcomputer 25 carries out processes similar to those in the case where the occurrence of a power outage is detected.

The operational status monitoring table 50 is explained below.

Figure 3:
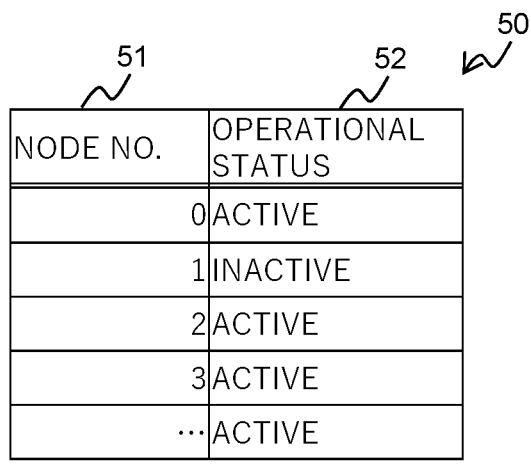
FIG. 3 is a structure chart of an operational status monitoring table related to the embodiment.

FIG. 3 is a structure chart of the operational status monitoring table 50 related to the embodiment.

The operational status monitoring table 50 manages operational status of each node and holds an entry for each node. Each entry in the operational status monitoring table 50 includes a node number 51 and operational status 52. The node number 51 holds information identifying the node 10 (i.e., node number). The operational status 52 holds an operating condition of the node 10 corresponding to the entry. The operating conditions include "active," which means that the node is in operation, and "inactive," which means that the node is not in operation, for example.

The processing operations of the multi-node system 1 are explained below.

Figure 4:
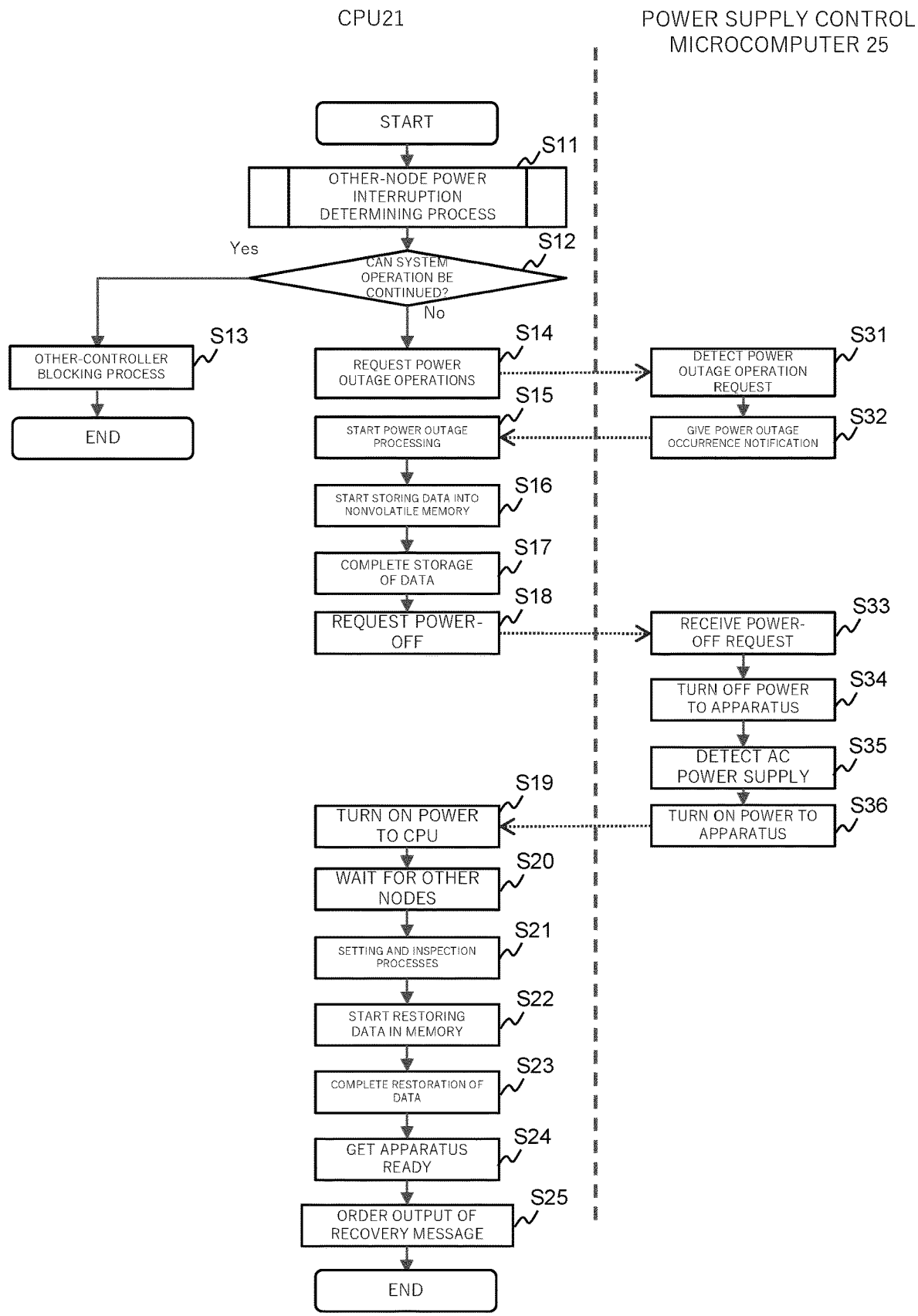
FIG. 4 is a flowchart of power supply control processing related to the embodiment.

FIG. 4 is a flowchart of power supply control processing related to the embodiment. The power supply control processing is carried out by each controller 20 in each node 10, for example. The processing is performed when the CPU 21 of the controller 20 detects a disconnection of a path between the own node and the controller 20 of another node 10 connected via the node-to-node connection hub 2.

Based on the disconnected path, the CPU 21 determines whether or not a power interruption has occurred in the node 10 connected with this path due to a power outage therein (partial outage). Upon determination that a power interruption has occurred in the node 10, the CPU 21 updates the operational status of the corresponding node in the operational status monitoring table 50 to "inactive" (S11). Here, the occurrence of a power outage in the node 10 may be determined, for example, by determining whether or not all paths between all controllers 20 in the same node 10 are disconnected (communication impossible).

The CPU 21 then determines (S12) whether or not the operation of the processing (I/O processing in this embodiment) by the multi-node system 1 can be continued (i.e., whether or not the system operation can be continued). For example, in a case where a predetermined number of (e.g., two) nodes are inactive in the multi-node system 1, it is determined that the system operation cannot be continued. As another example, where all nodes 10 managing the control information necessary for execution of the processing by the multi-node system 1 are inactive, it is determined that the system operation cannot be continued. As a further example, where the performance of the processing by the multi-node system 1 is found to be lower than a predetermined performance level, it is determined that the system operation cannot be continued.

In the case where it is determined that the system operation can be continued (S12: Yes), the CPU 21 performs a process of treating as blocked the controller 20 with which the path is detected to be disconnected (S13; other-controller blocking process). The CPU 21 then terminates the processing.

On the other hand, in the case where it is determined that the system operation cannot be continued (S12: No), the CPU 21 requests the power supply control microcomputer 25 to perform the power outage operations (S14).

Upon detecting the request for the power outage operations (S31), the power supply control microcomputer 25 transmits a power outage occurrence notification to the CPU 21 (S32).

Upon receipt of the power outage occurrence notification from the power supply control microcomputer 25, the CPU 21 starts the power outage processing (S15). The CPU 21 starts to store into the nonvolatile memory 23 (S16) the necessary information held in the memory 22 or in an internal volatile memory (e.g., cached data and the control information necessary for the I/O processing of the multi-node system 1). Upon completing the storage of the necessary information (S17), the CPU 21 transmits to the power supply control microcomputer 25 a request to turn off power to the controller 20 (S18).

Upon receipt of the request to turn off power (S33), the power supply control microcomputer 25 turns off the supply of power to the controller 20 (S34). This is the state in which the power supply control microcomputer 25 detects the supply of AC power.

In this case, meanwhile, the supply of AC power to the node 10 is being continued. Upon detecting the AC power supply (S35), the power supply control microcomputer 25 turns on the supply of power to (i.e., restarts) the components in the node 10 (S36).

With the power supply turned on by the power supply control microcomputer 25, the supply of power to the CPU 21 is turned on (S19). The CPU 21 waits for the other nodes in the multi-node system 1 to be turned on (S20). In this case, all active nodes other than the node in which the partial outage has occurred (i.e., remaining nodes) wait for the node in the partial outage to recover therefrom and be turned on.

Later, with the node 10 in the partial outage having recovered therefrom, the CPU 21 performs processes such as a process of making settings for allowing the multi-node system 1 to perform the I/O processing and a process of inspection (S21). The CPU 21 then starts to restore the data held in the nonvolatile memory 23 into its initially stored regions (S22). With the restoration of the data completed (S23), the node 10 enters a state (called the ready state) in which it can perform the I/O processing in the multi-node system 1 (S24). The CPU 21 then gives a predetermined apparatus (e.g., management apparatus, not depicted, in the node 10) an instruction to output a recovery message indicating automatic recovery from the partial outage (S25). This allows the recovery message to be displayed in a manner enabling an administrator of the multi-node system 1 to recognize the indication.

When the node 10 recovers from the partial outage, the multi-node system 1 described above allows the node 10 to reach automatically the state in which the I/O processing can be performed, without intervention of maintenance personnel.

The present invention is not limited to the preferred embodiment discussed above and may be implemented in diverse variations so far as they are within the scope of this invention.

For example, in the above-described embodiment, each controller 20 in each node 10, i.e., each of all the controllers 20, is configured to perform the power supply control processing. However, this is not limitative of the present invention. Alternatively, at least one controller 20 alone may be configured to execute the power supply control processing.

What is claimed is:

1. A multi-node system comprising:
   a plurality of nodes each including at least one controller,
   the controller including a processor, a power supply control device configured to control supply of power to the controller, a volatile memory, and a nonvolatile memory,
   wherein the processor detects whether or not any one of the nodes is inactive due to a power outage,
   the processor determines whether or not operation of the multi-node system can be continued, based on comparing a performance of processing by the multi-node system to a predetermined performance level,
   upon determination that the operation of the multi-node system cannot be continued, the processor saves necessary data held in the volatile memory into the nonvolatile memory,
   the power supply control device restarts the processor, and,
   when the node in the power outage has recovered therefrom following the restart, the multi-node system is caused to start processing.

2. The multi-node system according to claim 1, wherein the controller of some of the plurality of nodes stores control information necessary for continuing the operation of the multi-node system.

3. The multi-node system according to claim 2, wherein, when all nodes that store the control information are inactive, the processor determines that the operation of the multi-node system cannot be continued.

4. The multi-node system according to claim 1,
   wherein each of the nodes has a plurality of communicable paths, and,
   when all the paths of any one of the nodes become non-communicable, the processor detects that the node is inactive due to the power outage.

5. The multi-node system according to claim 1, wherein, after the multi-node system is caused to start processing, the processor causes outputting of a message indicating automatic recovery from a partial outage.

6. A power supply control method for use with a multi-node system having a plurality of nodes each including at least one controller,
   the controller including a processor, a power supply control device configured to control supply of power to the controller, a volatile memory, and a nonvolatile memory,
   the power supply control method comprising:
   causing the processor to detect whether or not any one of the nodes is inactive due to a power outage;
   causing the processor to determine whether or not operation of the multi-node system can be continued, based on comparing a performance of processing by the multi-node system to a predetermined performance level;
   upon determination that the operation of the multi-node system cannot be continued, causing the processor to save necessary data held in the volatile memory into the nonvolatile memory;
   causing the power supply control device to restart the processor; and,
   when the node in the power outage has recovered therefrom following the restart, causing the multi-node system to start processing.

* * * * *